Patented Oct. 16, 1934

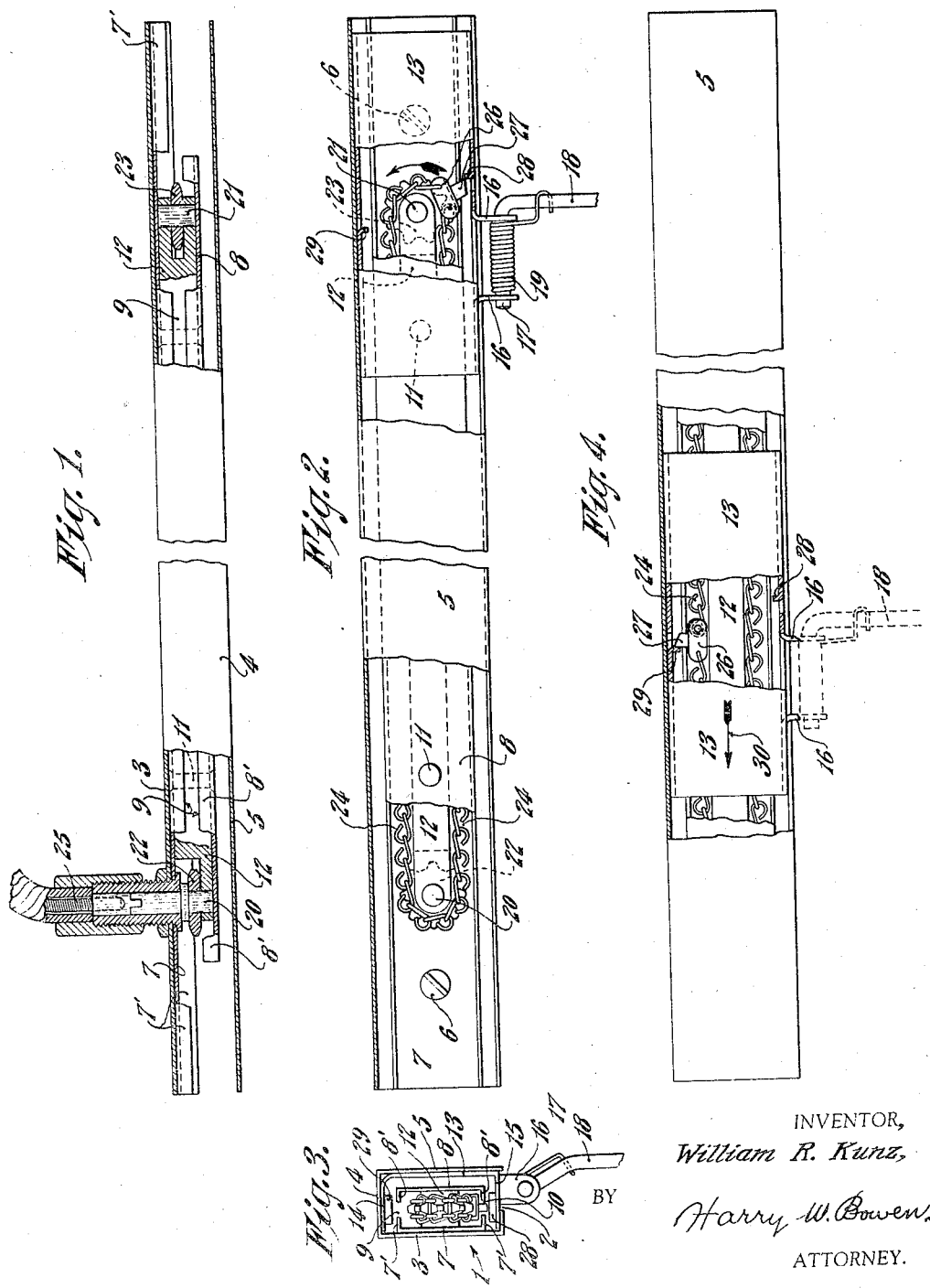

1,977,188

UNITED STATES PATENT OFFICE 1,977,188

WINDSHIELD WIPER

William R. Kunz, Springfield, Mass.

Application August 8, 1933, Serial No. 684,211

7 Claims. (Cl. 74—37)

This invention relates to improvements in windshield wipers.

An object of my invention is to provide a windshield wiper that is actuated for reciprocation, in opposite directions, across the length of the windshield and in a horizontal plane, whereby the entire length of the windshield may be cleaned of rain, snow, or moisture, in order that the operator of a motor vehicle may have an unobstructed view over the full area of the windshield.

Broadly, my invention comprises an endless, flexible, travelling member, with means for operating the same, means for providing a confining channel, or path, for the flexible member, a wiper element operated from the two strands of the flexible member, so that it will alternately travel in opposite directions across the windshield, and means for automatically disengaging the driving, flexible means from the supporting member of the wiper element at opposite ends of its travel across the windshield, as will be fully described.

Windshield wipers, which move in a horizontal direction, are a part of the prior art, but my improvement is designed to materially lessen the cost of construction, increase the efficiency, and, at the same time, provide an attractive appearance.

Referring to the drawing:—

Fig. 1 is a top, plan view, partially in section, showing the driving means with the endless chain omitted.

Fig. 2 is a side, elevational view, partially in section, showing the guiding means for the endless conveyor, and the wiper member at one end of its travel.

Fig. 3 is an end view of Fig. 2, looking from the left-hand end of Fig. 2, and

Fig. 4 is a side, elevational view, showing the wiper in dotted line position, when moving towards the lefthand end of the windshield.

Referring to the drawing in detail:—

1 designates a tubular casing member, having the opening 2 in its lower edge; the sides of the casing are indicated at 3, 4, and 5. This casing is secured to an adjacent part of the motor vehicle by means of the screws, or bolts, or any suitable means, indicated at 6. 7 and 8 indicate two U-shaped members having their upper and lower flanges, 7' and 8', extending towards each other to form the passageways 9 and 10. The U-shaped members 7 and 8 are secured together in spaced relation, by means of the rivets 11. 12 designates a rectangular-shaped spacer member, preferably a square in cross section, that is permanently secured to the two U-shaped members 7 and 8, with the rivets 11, as shown in Fig. 1.

Located within the casing member 1, is a slidable member, comprising the portions 13, 14, and 15, (see Fig. 3). Depending from the lower portion 15 are the struck-up ear pieces 16, in which is pivotally located the bent arm 17 of the wiper member 18, that is held against the windshield (not shown) by the coiled spring 19.

Rotatably mounted in the opposite ends of the spacer member 12 are the shafts 20 and 21, on which the sprocket wheels 22 and 23 are secured with a driving fit. Passing around these wheels is the endless chain 24, that is operated by the flexible shaft 25, that is connected to the shaft 20. This chain is provided, or formed, with a special shaped link 26, having the projection member, or part 27, the purpose of which is, during the travel of the chain, to engage the struck-up parts 28 and 29, on the slidable member 13 and move the wiper member 18 in opposite directions, during the continuous travel of the chain 24. Looking at Fig. 2, it will be observed that the projection 27 of the chain is just leaving, or becoming disengaged from the part 28 of the reciprocable member 13 which supports the wiper 18. In this position of the parts, the wiper has completed its extreme travel towards the righthand end. As the chain 24 continues to travel, the projection 27 will engage the next, or upper, struck-up part 29, as shown in Figs. 2 and 4, which will move the slidable member 13 and wiper 18 in the opposite direction, as shown by the arrow 30. When the member 13 reaches the extreme lefthand position, the part 29 is disengaged and the part 28 is again engaged by the projection 27, and, as the lower strand of the chain 24 always travels in the opposite direction from the arrow 30, the slidable member 13 and wiper 18 will be moved across the windshield to the full line position, shown in Fig. 2. The projection 27 will again repeat the operation of engaging the upper part 29 and move the wiper towards the lefthand.

An important feature of my invention is the track provided by the spacer member 12 for the chain 24, whereby the two longitudinal channels, one above and one below this member, as shown are provided.

It is to be understood that the casing member 1, spacer 12, U-shaped members 7 and 8 and slidable member 13 can, if desired, be shaped so as to travel in any desired direction, as linear, curved, or combination of a straight line and arcs on either end.

It will be seen, from this description, that I have provided a windshield wiper that is simple in construction, and very efficient in its operation.

What I claim is:—

1. Means for operating a windshield wiper comprising in combination a casing, an endless conveyor, oppositely located and spaced U-shaped means secured to the casing for confining the travel of the said conveyor, means for operating the conveyor, a slidable member outside of the said spaced and fixed means and to which the wiper element is secured, co-operating means between the said conveyor and the slidable member comprising a rigid projection on the conveyor and projections on the slidable member, the construction and arrangement being such that the slidable member is alternately and automatically engaged and disengaged by the conveyor at the ends of the travel of the strands of the conveyor, whereby the wiper element is operated in opposite directions.

2. In a windshield wiper construction, a casing member, an endless conveyor having parallel linear strands, a bar member in the casing substantially one-third of the height of the casing member and located midway between the upper and lower edges of the casing for separating the strands to provide a channel above, below and between the bar and the casing, a support for a wiper element, co-operating projecting means respectively between the support of the wiper element and the said conveyor, comprising a projecting part on the conveyor and projecting parts on the wiper support that are located in the path of the said part during the linear travel of the strands of the conveyor but are free from the said parts on the support at the opposite ends of the travel of said strands.

3. A windshield wiper comprising, in combination, a casing, spaced U-shaped members in the casing, a spacer member in the said members and located midway between the upper and lower edges of said members for providing passageways in said members, an endless conveyor in the passageways having one strand located above and one strand located below the spacer member, means at the ends of the spacer member for supporting and driving the endless conveyor, a slidable support for a wiper element, and co-acting means between the wiper element support and the conveyor for alternately changing the direction of travel of the wiper element.

4. In combination, in a windshield wiper, a casing, oppositely located U-shaped members between which a spacer member is located and secured thereto, said members being secured to the casing, the U-shaped members having their flanges spaced from each other, the spacer member therein being located midway between the upper and lower edges of the U-shaped members for providing passageways between it and the U-shaped members, a sprocket wheel rotatably supported at each end of the spacer, a conveyor supported on the spacer and sprocket wheels and having its strands located in the passageways, a projection on the conveyor the strands of which travel in said spaces between the flanges, a movable wiper support located in the casing, parts on the said support located in the line of travel of the conveyor and engaged by the projection on the conveyor when the strands travel in opposite directions but are disengaged as the projection passes around the sprocket wheels, as described.

5. A windshield cleaner having in combination, a casing, a spacer member therein comprising a bar attached to the casing midway between its upper and lower edges, sprocket wheels rotatably supported on the opposite ends of the bar and in supported in line with the axis of the spacer member, a flexible line which is supported on the sprocket wheels, the spacer member and casing serving to provide guide or passageway spaces above and below the bar for the strands of the flexible member, a support for a wiper member which is slidably mounted in the casing, co-operating means on the flexible member and the slidable wiper support, for moving the support in opposite directions, and means for driving the flexible member.

6. In a windshield cleaner construction, a casing member, an endless conveyor therein, a centrally located member in the casing to provide oppositely located and spaced means above and below said member for confining the strands of travel of the said conveyor, means for operating the conveyor, a U-shaped slidable member located outside of the said centrally located member spaced means, co-operating engaging means between the said conveyor and the slidable member comprising a rigid projection on the conveyor and projections on the slidable member for moving the slidable member in opposite directions, as described.

7. In a windshield wiper construction, means for operating the wiper comprising a casing, an endless conveyor having parallel strands, a bar in the casing for separating the strands to provide travel spaces or channels for the endless conveyor between the bar and the casing, a slidable member, projecting means on both the conveyor and the slidable member which engage each other for moving the slidable member in opposite directions.

WILLIAM R. KUNZ.